United States Patent [19]
Morimoto

[11] Patent Number: 5,217,086
[45] Date of Patent: Jun. 8, 1993

[54] CONTROL SYSTEM FOR A VEHICLE
[75] Inventor: Yoshihiko Morimoto, Mitaka, Japan
[73] Assignee: Fuji Jukogyo Kabushiki Kaisha, Tokyo, Japan
[21] Appl. No.: 515,764
[22] Filed: Apr. 13, 1990

Related U.S. Application Data
[63] Continuation of Ser. No. 223,561, Jul. 25, 1988, abandoned.

[30] Foreign Application Priority Data

Aug. 19, 1987 [JP] Japan .................................. 62-206995

[51] Int. Cl.⁵ .............................................. B60K 31/00
[52] U.S. Cl. ....................................... 180/177; 74/866
[58] Field of Search ............... 180/170, 175, 176, 177, 180/179; 74/866, 865; 364/424.01

[56] References Cited

U.S. PATENT DOCUMENTS

| | | | |
|---|---|---|---|
| 4,541,052 | 9/1985 | McCulloch | 180/179 |
| 4,736,813 | 4/1988 | Hayama et al. | 180/177 |
| 4,771,656 | 9/1988 | Itoh | 74/866 |
| 4,782,934 | 11/1988 | Takano et al. | 74/866 |
| 4,793,217 | 12/1988 | Morisawa et al. | 74/866 |

FOREIGN PATENT DOCUMENTS 59-87311 6/1984 Japan .

*Primary Examiner*—David M. Mitchell
*Attorney, Agent, or Firm*—Martin A. Farber

[57] ABSTRACT

A control system for a vehicle has a continuously variable automatic transmission, an automatic transmission control system for controlling the automatic transmission, and a cruise control system for controlling speed of the vehicle to a desired cruising speed. The cruise control system has a vehicle speed sensor, and a desired cruising speed providing section responsive to an output signal of the vehicle speed sensor for providing the desired cruising speed. The vehicle speed sensor is used for both the automatic transmission control system and the cruise control system.

7 Claims, 3 Drawing Sheets

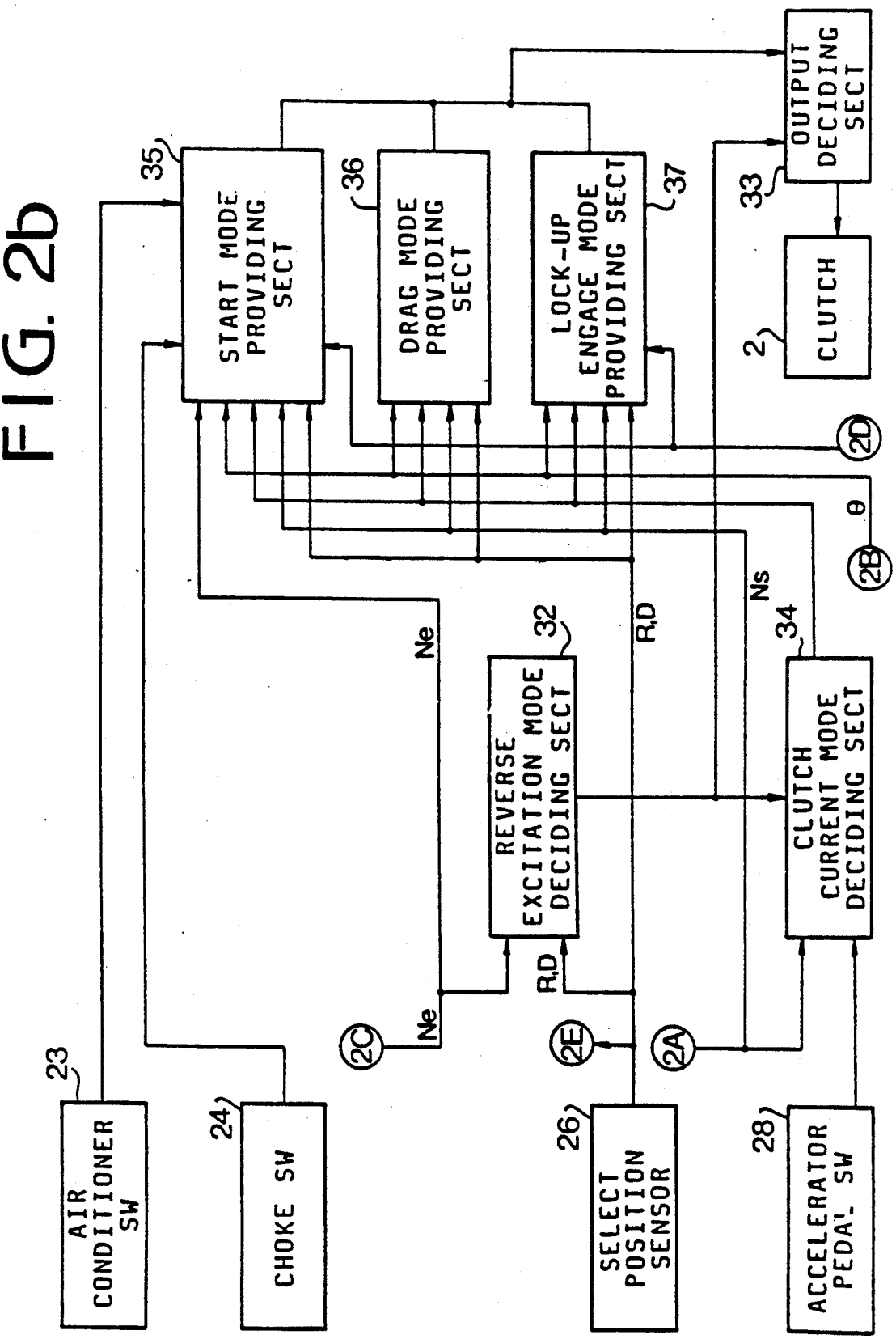

CONTROL SYSTEM FOR A VEHICLE

RELATED APPLICATION

This application is a continuation of my co-pending application Ser. No. 07/223,561 filed Jul. 25, 1988 and now abandoned.

BACKGROUND OF THE INVENTION

The present invention relates to a control system for a motor vehicle, and more particularly to a system for a motor vehicle having an automatic transmission system and a cruise control system.

Such a motor vehicle is provided with electronic control systems for detecting various data on operating conditions of an engine and driving conditions of the vehicle, and for actuating corresponding devices of the vehicle. Particularly, an electronic control system for automatically controlling an automatic transmission such as a continuously variable belt-drive transmission has a transmission control system which controls the transmission together with an electromagnetic clutch. Further, Japanese Utility Model Application Laid-open 59-87311 discloses a control system in which a controller is provided for managing a transmission control together with an air-conditioner control.

Recently, a cruise control system which holds the vehicle to a speed set by a driver has been installed in a vehicle. The cruise control system has switches, sensors, actuators, and an electronic controller for processing signals from these switches and sensors. A number of switches and sensors in the cruise control system has the same functions as those in the transmission control system. However, the cruise control system and the transmission control system are separately provided without common components. Accordingly, the number of the components unnecessarily increases to increase manufacturing cost of the vehicle.

SUMMARY OF THE INVENTION

The object of the present invention is to provide a control system for a motor vehicle which has a simple structure and operation.

The other objects and features of this invention will become understood from the following description with reference to the accompanying drawings.

BRIEF DESCRIPTION OF DRAWINGS

FIGS. 2a and 2b show a block diagram of a control unit according to the present invention.

DETAILED DESCRIPTION OF THE PREFERRED EMBODIMENT

Figure 1:
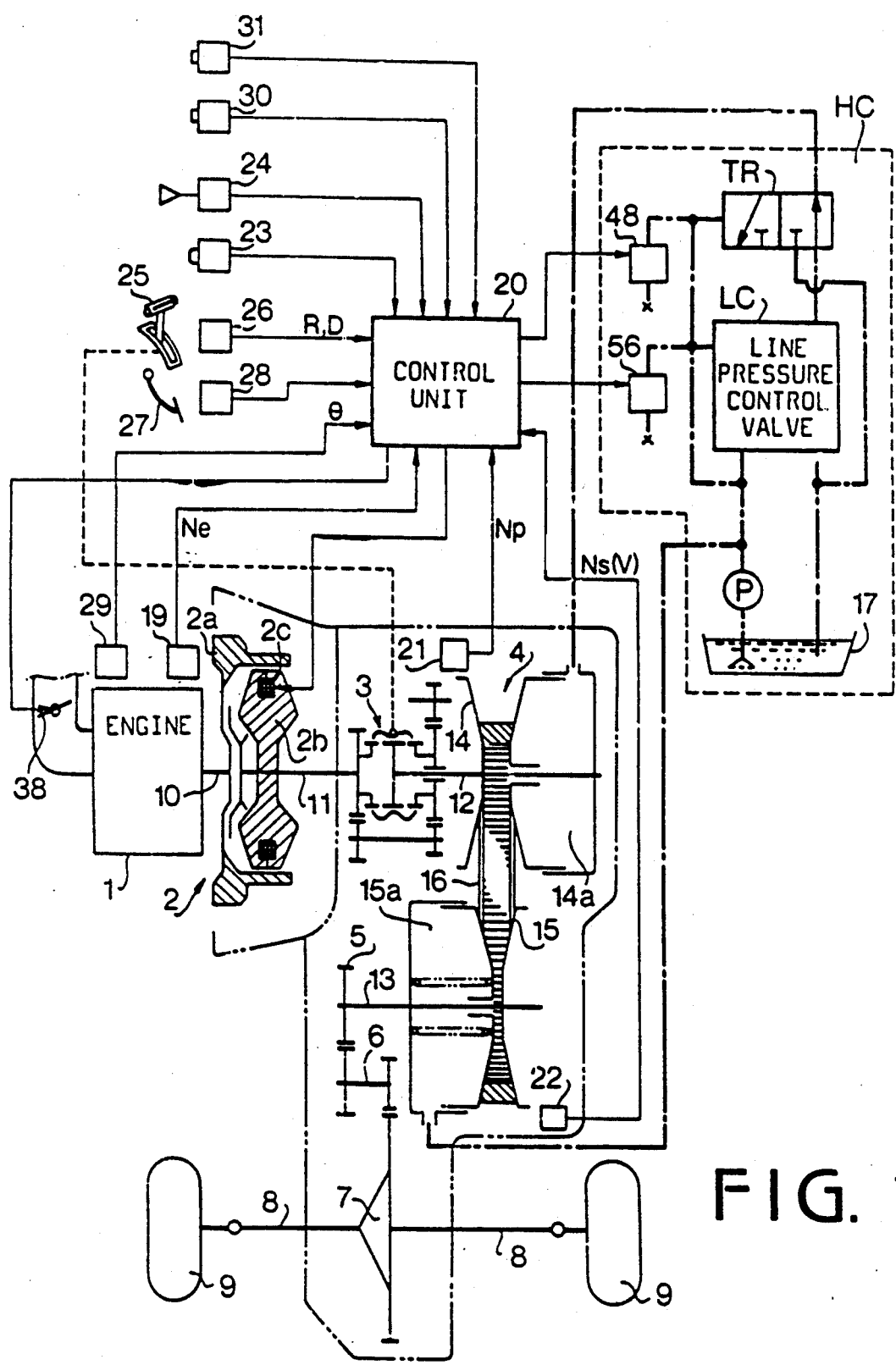
FIG. 1 is a schematic illustration of a control system for a motor vehicle to which the present invention is applied.

Referring to FIG. 1, a crankshaft 10 of an engine 1 is operatively connected to an electromagnetic powder clutch 2 for transmitting the power of the engine 1 to a continuously variable belt-drive automatic transmission 4 through a selector mechanism 3. The output of the belt-drive transmission 4 is transmitted to axles 8 of vehicle driving wheels 9 through an output shaft 13, a pair of intermediate reduction gears 5, an intermediate shaft 6, and a differential 7.

The electromagnetic powder clutch 2 comprises an annular drive member 2a connected to the crankshaft 10 of the engine 1, a driven member 2b secured to an input shaft 11 of the transmission 4, and a magnetizing coil 2c provided in the driven member 2b. Magnetic power material is provided in a gap between the drive member 2a and driven member 2b. When the magnetizing coil 2c is excited by the clutch current, the driven member 2b is magnetized to produce a magnetic flux passing through the drive member 2a. The magnetic powder is aggregated in the gap by the magnetic flux and the driven member 2b is engaged with the drive member 2a by the powder. On the other hand, when the clutch current is cut off, the drive and driven members 2a and 2b are disengaged from one another.

In the belt-drive transmission 4, the selector mechanism 3 is provided between the input shaft 11 and a main shaft 12. The selector mechanism 3 is provided with a synchromesh mechanism comprising gears, hub, and sleeve for connecting the input shaft 11 and the main shaft 12 to selectively provide a driving position (D) and a reverse driving position (R).

The continuously variable belt-drive automatic transmission 4 has the main shaft 12 and the output shaft 13 provided in parallel with the main shaft 12. A drive pulley 14 provided with a hydraulic cylinder 14a is mounted on the main shaft 12. A driven pulley 15 provided with a hydraulic cylinder 15a is mounted on the output shaft 13. A drive belt 16 engages with the drive pulley 14 and the driven pulley 15. Hydraulic cylinders 14a and 15a are communicated with an oil hydraulic control circuit HC. The cylinder 14a is supplied with pressurized oil by an oil pump P from an oil reservoir 17 passing through a line pressure control valve LC and a transmission ratio control valve TR. The cylinder 15a is applied with pressurized oil from the pump P. The hydraulic control circuit HC is responsive to vehicle speed, engine speed and throttle valve position for controlling the amount of oil supplied to the cylinders 14a and 15a. The pulleys 14 and 15 are operated by compressive forces of the cylinders so that the running diameter of the belt 16 is varied to infinitely change the transmission ratio (i) of the transmission 4.

An electronic control system for the clutch 2 and the belt-drive transmission 4 has an engine speed sensor 19, and rotating speed sensors 21 and 22 for sensing rotating speeds of the drive pulley 14 and the driven pulley 15, respectively. The driven pulley speed sensor 22 serves as a vehicle speed sensor. A choke switch 24 produces an output signal when a choke valve of the engine 1 is closed, and an air conditioner switch 23 produces an output signal at the operation of an air conditioner. A selector lever 25 connected to the selector mechanism 3 is provided with a select position sensor 26 for sensing the driving position (D) and the reverse driving position (R). An accelerator pedal switch 28 is provided for sensing the depression of an accelerator pedal 27 of the vehicle, and a throttle position sensor 29 is provided on a throttle valve 38 of the engine 1.

Output signals of the sensors and pulses of the switches are applied to an electronic control unit 20 which produces and sends a clutch current control signal to the clutch 2 and a control signal for controlling the transmission ratio (i) and a line pressure control signal to the control circuit HC.

A cruise control system is operated by a cruise control switch 30 comprising a main switch and a sub switch including a set, resume and coast switches, and a brake switch 31. The control unit 20 produces a cruise control signal for controlling the throttle valve 38 in accordance with output signals from these switches and the transmission ratio control signal.

Figure 2A:
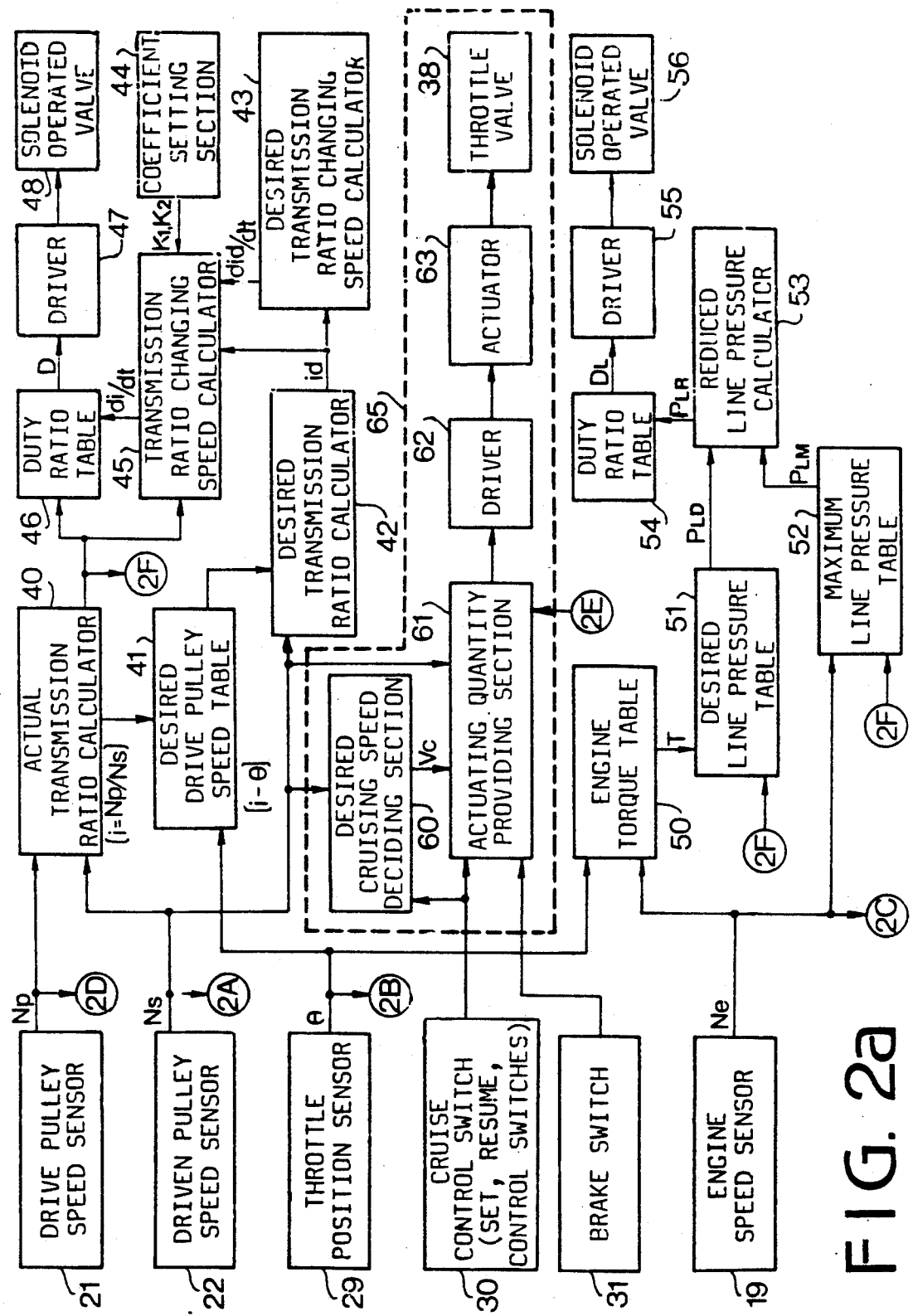

Referring to FIGS. 2a and 2b showing the control unit 20 of FIG. 1, a reverse excitation mode deciding section 32 is applied with engine speed signal $N_e$ of the sensor 19 and drive position signal of the select position sensor 26. When the engine speed $N_e$ is below 300 rpm, or the selector lever 25 is at a neutral position (N) or a parking position (P), the reverse excitation mode deciding section 32 produces a reverse excitation signal which is applied to an output deciding section 33, so that a small reverse current flows in the clutch 2 to release the clutch completely.

A clutch current mode deciding section 34 is applied with signals from the reverse excitation mode deciding section 32 and accelerator pedal switch 28, and vehicle speed signal $N_s$ from the driven pulley speed sensor 22 for deciding driving conditions such as a starting mode to produce output signals. The output signals are applied to a start mode providing section 35, drag mode providing section 36, and clutch lock-up engage mode providing section 37.

The start mode providing section 35 decides clutch current of a starting characteristic dependent on the engine speed $N_e$ at ordinary start or at closing of the choke switch 24 or air conditioner switch 23. The starting characteristic is corrected by signals from the throttle valve opening degree $\theta$, vehicle speed V, and driving positions (D) and reverse position (R).

The drag mode providing section 36 decides a small drag current when the accelerator pedal 27 is released at a low speed in the driving position (D) and the reverse driving position (R) for providing a drag torque to the clutch 2 for the reduction of clearances formed in the transmission and for the smooth start of the vehicle.

The clutch lock-up engage mode providing section 37 decides a lock-up current in response to the vehicle speed V and throttle opening degree $\theta$ at the driving position (D) and reverse driving position (R) for entirely engaging the clutch 2. Outputs of sections 35, 36 and 37 are applied to the output deciding section 33 to control the clutch current.

A system for controlling the transmission ratio and the line pressure will now be described. Output signals $N_P$ and $N_s$ of sensors 21, 22 are fed to an actual transmission ratio calculator 40 to produce an actual transmission ratio i in accordance with $i = N_P/N_S$. The actual transmission ratio i and output signal $\theta$ of the throttle position sensor 29 are fed to a desired drive pulley speed table 41 to derive a desired drive pulley speed Npd in accordance with values of the ratio i and signal $\theta$. The desired drive pulley speed Npd and the driven pulley speed Ns are fed to a desired transmission ratio calculator 42 to calculate a desired transmission ratio id in accordance with the speeds Npd and Ns which corresponds to vehicle speed.

The desired transmission ratio id is fed to a desired transmission ratio changing speed calculator 43 which produces a desired transmission ratio changing rate did/dt. The speed did/dt is the amount of change of the desired transmission ratio id during a predetermined time interval. A coefficient setting section 44 is provided for producing coefficients K1 and K2. The actual transmission ratio i, desired transmission ratio id, desired transmission ratio changing rate did/dt and coefficients K1 and K2 are applied to a transmission ratio changing speed calculator 45 to produce a transmission ratio changing rate di/dt from the following formula.

$$di/dt = K1\ (id - i) + K2 \cdot did/dt$$

In the formula, the term (id − i) is a control quantity dependent on the difference between the desired and actual transmission ratios and did/dt is a term for advancing the delay in phase caused by a first order lag in the system.

The rate di/dt and actual transmission ratio i are applied to a duty ratio table 46 to derive a duty ratio D in accordance with D = f (di/dt, i) using a table at upshift and downshift of the transmission. The duty ratio D is supplied to a solenoid operated on-off valve 48 through a driver 47. The valve 48 is provided in the hydraulic circuit HC, for shifting a spool of the transmission ratio control valve TR to control the transmission ratio.

On the other hand, engine speed $N_e$ from the engine speed sensor 19 and throttle opening degree $\theta$ from the throttle position sensor 29 are applied to an engine torque table 50 to derive an engine torque T. The engine torque T and the actual transmission ratio i from the calculator 40 is applied to a desired line pressure table 51 to derive a desired line pressure $P_{LD}$.

In a hydraulic circuit HC of the control system, oil pressure discharged from the pump varies in accordance with the change of the engine speed $N_e$, so that a maximum line pressure $P_{LM}$ also varies. In order to detect the variance of the maximum line pressure $P_{LM}$, the control unit is provided with a maximum line pressure table 52 to which the engine speed $N_e$ and the actual transmission ratio i are supplied. Therefore, the maximum line pressure $P_{LM}$ is obtained.

The desired line pressure $P_{LD}$ and the maximum line pressure $P_{LM}$ are applied to a reduced line pressure calculator 53 wherein a reduced line pressure $P_{LR}$ is calculated based on the proportion of the desired line pressure $P_{LD}$ to the maximum line pressure $P_{LM}$. The reduced line pressure $P_{LR}$ is applied to a duty ratio table 54 to derive a duty ratio $D_L$ corresponding to the reduced line pressure $P_{LR}$. The duty ratio $D_L$ is supplied to driver 55 which operates a solenoid operated on-off valve 56 at the duty ratio $D_L$. The valve 56 is provided in the hydraulic circuit HC, for shifting a spool of the line pressure control valve LC to control the line pressure.

Describing the cruise control system 65, the driven pulley speed signal $N_s$ as the vehicle speed for the transmission is applied to a desired cruising speed deciding section 60 and an actuating quantity providing section 61. The desired cruising speed deciding section 60 is further applied with a signal from the cruise control switch 30 such as the set switch. The section 60 stores the vehicle speed at the time when the set switch is closed. The stored vehicle speed is set as a desired cruising speed $V_c$. An output signal representing the cruising speed $V_c$ is fed to the actuating quantity providing section 61. The actuating quantity providing section 61 determines the actuating quantity of the throttle valve in accordance with the difference between the desired cruising speed $V_c$ and the actual vehicle speed represented by driven pulley speed $N_s$ from the driven pulley speed sensor 22. An output signal of the section 61 is applied to an actuator 63 through a driver 62 for controlling the throttle valve 38. When a brake signal from the brake switch 31 or a neutral position signal N from the select position sensor 26 are applied to the section 61, the cruise control is canceled.

Describing the operation, when the accelerator pedal 27 is released and the P or N position is selected by the selector lever 25, the reverse excitation signal is produced from the reverse excitation mode deciding section 32 to release the clutch 2 completely. When the driving position is selected at the release of the accelerator pedal, the drag mode providing section 36 is applied with the signal from the clutch current mode deciding section 34 for providing a drag torque to the clutch 2 for the smooth start of the vehicle.

When the accelerator pedal 27 is depressed in this state, the start mode providing section 35 produces the signal for providing the clutch current to the clutch 2 in proportion to the engine speed. Thus, the clutch 2 is engaged for starting the vehicle. When the vehicle speed reaches a predetermined speed, the lock-up engage mode providing section 37 produces the signal so that the lock-up current is supplied to the clutch 2 for entirely engaging the clutch.

When the accelerator pedal is depressed, the clutch current increases progressively with increase of engine speed. The electromagnetic clutch 2 is gradually engaged, transmitting the engine power to the drive pulley 14. The power of the engine is transmitted to the output shaft 13 at the largest transmission ratio by the drive belt 16 and driven pulley 15, and further transmitted to axles of the driving wheels 9. Thus, the vehicle is started.

The control operation of line pressure will be described hereinafter. From the engine torque table 50, a torque T is obtained in accordance with throttle opening degree $\theta$ and engine speed $N_e$, which is applied to desired line pressure table 51. The desired line pressure $P_{LD}$ and the maximum line pressure $P_{LM}$ obtained from the table 52 are fed to the reduced line pressure calculator 53. The calculator 53 calculates a reduced line pressure $P_{LR}$. The solenoid operated on-off valve 56 is operated at a duty ratio $D_L$ corresponding to the reduced line pressure $P_{LR}$. The line pressure is applied to cylinder 15a to hold the belt 16 at a necessary minimum force, the transmitting torque at which is slightly larger than the engine torque T. Thus, the power is transmitted through the transmission without slipping of the belt 16.

In the transmission ratio control operation, the output signals $N_p$ and $N_s$ from the drive pulley and driven pulley speed sensors 21 and 22 are read at the actual transmission ratio calculator 40 for calculating the actual transmission ratio i. A desired drive pulley speed $N_{pd}$ is derived from the desired drive pulley speed table 41 in accordance with values of the ratio i and signal $\theta$ from the throttle position sensor 29.

The desired transmission ratio id is calculated at the calculator 42 based on the desired drive pulley speed $N_{pd}$ derived from the table 41. Further, the desired transmission ratio changing rate did/dt and transmission ratio changing rate di/dt are calculated at calculators 43 and 45 based on the actual transmission ratio i, desired transmission ratio id and coefficients $K_1$ and $K_2$. The transmission ratio changing rate di/dt is fed to the duty ratio table 46, so that duty ratio D for valve 48 is obtained from the table 46.

When the drive pulley speed is substantially constant, the desired transmission ratio id calculated based on the desired drive pulley speed Npd and the driven pulley speed $N_s$ has the same value as the desired transmission ratio id calculated based on the driven pulley speed Ns and throttle opening degree $\theta$. In a range where the drive pulley speed $N_p$ varies, a proper desired transmission ratio id is calculated based on a desired drive pulley speed Npd derived from the table 41.

The duty signal is supplied to the solenoid operated valve 48 to produce the control pressure. Thus, a spool of the transmission ratio control valve TR is shifted by the control pressure to supply the oil to the cylinder 14a or to drain the oil from the cylinder 14a. When the duty ratio D is small, the valve TR is positioned in the oil supply position. Thus, the oil is supplied to the cylinder 14a to upshift the transmission. On the other hand, when the duty ratio is large, the valve TR is positioned in the oil drain position, so that the oil in the cylinder 14a is drained to downshift the transmission. In this case, the transmission ratio changing rate di/dt corresponds to the change of the duty ratio D. When the difference between the desired transmission ratio id and the actual transmission ratio i is small, deviation of the duty ratio D becomes small, thereby reducing the actual transmission ratio changing rate.

As the difference between the desired ratio id and actual ratio i becomes large and the desired transmission ratio changing rate di/dt becomes large, deviation of the duty ratio D for the valve 48 becomes large, thereby increasing the actual transmission ratio changing rate.

When the vehicle is driven at a high speed at a minimum transmission ratio changing rate in overdrive and the main switch and the set switch of the switch 30 are turned on, the cruise control system is actuated. In the section 60, a desired cruising speed $V_c$ is set when the set switch is turned on. The throttle valve 38 is controlled in accordance with the signal from the section 61 representing the difference between the cruising speed $V_c$ and the vehicle speed $N_s$ to control the vehicle speed to the desired cruising speed. When the resume switch is turned on, the throttle valve 38 is adapted to gradually open. On the other hand, when the coast switch is turned on, the throttle valve gradually closes. The section 61 stops producing the output signal in response to the brake signal or the neutral position signal N to cancel the cruise control.

In accordance with the present invention, the transmission control system and the cruise control system for the vehicle have many common elements. Namely, the output signal of the driven pulley speed sensor is used for producing the actual transmission ratio and the desired transmission ratio, and also for producing the desired cruising speed and the actuating quantity for the throttle valve. Thus, the structure and the operation of the control system can be simplified with low cost.

What is claimed is:

1. A control system of a motor vehicle, for controlling an infinitely variable transmission, powered by an engine controlled by a throttle valve, and for controlling a cruise control system, the control system of the motor vehicle comprising a vehicle speed sensor detecting vehicle speed,
said transmission having a drive pulley with a hydraulically shiftable first disc, a first hydraulic cylinder shifting the first disc, a driven pulley with a hydraulically shiftable second disc, a second hydraulic cylinder operating the second disc, and a belt engaged with said both of said pulleys,
a pressure oil circuit with a pump for supplying pressurized oil to said first and second hydraulic cylinders, a line pressure control valve with a first spool to control line pressure of the pressurized oil from the pump for said first and second hydraulic cylinders, and a transmission ratio control valve with a second spool to control the pressurized oil so as to move the first disc of the drive pulley to change transmission ratio of said transmission, said vehicle speed sensor detecting the vehicle speed by detecting rotational speed of said driven pulley, an electromagnetic clutch operatively transmitting power of said engine to said transmission, said cruise control system controlling speed of the vehicle to a desired cruising speed, the cruise control system including a cruise control switch signaling setting of the desired cruising speed of said motor vehicle, the pressure oil circuit further comprising a first solenoid valve connected via a first hydraulic pressure control line to said line pressure control valve controlling via said line pressure control valve said line pressure in said pressure oil circuit to an optimum value, the pressure oil circuit further comprising a second solenoid valve connected via a second hydraulic pressure control line to said transmission ratio control valve controlling via said transmission ratio control valve changing rate of said transmission ratio to a desired transmission ratio by changing pressure of said pressurized oil to said second spool, said first and second solenoids being operatively connected to and operatively responsive to said vehicle speed sensor, clutch current control means operatively connected to said electromagnetic clutch changing an engagement state of said electromagnetic clutch in dependency on a select position signal from a select position sensor, and said cruise control system comprising:

desired cruising speed deciding means responsive to said vehicle speed sensor and said cruise control switch providing said desired cruising speed, actuating quantity providing means responsive to said desired cruising speed, said cruise control switch, said vehicle speed sensor and said select position sensor providing an actuating quantity signal, and actuating means responsive to said actuating quantity signal controlling said throttle valve to maintain said vehicle speed at said desired cruising speed.

2. The control system according to claim 1, further wherein said clutch current control means changes said engagement state of said electromagnetic clutch further in dependency on a signal from said vehicle speed sensor.

3. The control system according to claim 1, further comprising means comprising a brake switch indicating braking of the vehicle, said actuating quantity providing means cancelling cruise control when the brake switch indicates braking of the vehicle.

4. The control system according to claim 1, wherein said cruise control switch includes cruise control set, resume and coast switches, said actuating quantity providing means for gradually opening the throttle valve via said actuating means when said resume switch is turned on.

5. The control system according to claim 1, wherein said cruise control switch includes cruise control set, resume and coast switches, said actuating quantity providing means for gradually closing the throttle valve via said actuating means when said coast switch is turned on.

6. The control system according to claim 1, further comprising a selector mechanism operatively connected between said clutch and said transmission selecting driving and reverse positions, respectively, a selector lever operatively connected to said selector mechanism and movable to selected positions of drive, reverse, neutral and park, and said select position sensor is responsive to the selected position of said selector lever, and said actuating quantity providing means cancelling cruise control when said select position sensor indicates neutral position of the selector mechanism.

7. A control system for an infinitely variable transmission of a motor vehicle powered by an engine controlled by a throttle valve, and an electromagnetic clutch connected between said engine and said infinitely variable transmission, the transmission comprising a drive pulley with a hydraulically shiftable first disc, a first hydraulic cylinder for shifting the first disc, a driven pulley with a hydraulically shiftable second disc, a second hydraulic cylinder for operating the second disc, and a belt engaged with said both pulleys, the control system comprising a pressure oil circuit with a pump supplying oil to said first and second hydraulic cylinders, a line pressure control valve with a first spool to control line pressure of pressurized oil from the pump, and a transmission ratio control valve with a second spool to control the pressurized oil so as to move the first disc of the drive pulley to change transmission ratio of said transmission, and a vehicle speed sensor detecting rotational speed of said driven pulley as vehicle speed and producing a vehicle speed signal, a cruise control system with a cruise control switch signaling setting of a desired cruising speed of said motor vehicle and producing a cruising signal and a brake switch for detecting an operation of a brake pedal and producing a brake signal, the improvement wherein:

said pressure oil circuit comprises a first solenoid valve connected via a first hydraulic pressure control line to said line pressure control valve controlling said line pressure of said pressure oil circuit to an optimum value;

said pressure oil circuit comprises a second solenoid valve connected via a second hydraulic pressure control line to said transmission ratio control valve controlling a changing rate of said actual transmission ratio to a desired transmission ratio by changing pressure of said pressurized oil to said second spool;

said first and second solenoids being operatively connected to said vehicle speed sensor and being operatively responsive to said vehicle speed signal;

clutch current control means being operatively connected to said electromagnetic clutch changing an engagement state of said electromagnetic clutch in dependency on a select position signal from a select position sensor of driving conditions;

said cruise control system comprises:

desired cruising speed deciding means responsive to said vehicle speed and said cruising signals producing a desired cruising speed signal;

actuating quantity providing means responsive to said desired cruising speed, said cruising, said vehicle speed, said brake and said select position signals providing an actuating quantity signal; and actuating means responsive to said actuating quantity signal controlling said throttle valve to maintain the vehicle speed at said desired cruising speed.

* * * * *